US008719104B1

(12) United States Patent
Endresen

(10) Patent No.: US 8,719,104 B1
(45) Date of Patent: May 6, 2014

(54) ACQUIRING MULTIPLE ITEMS IN AN IMAGE

(75) Inventor: Geoffrey E. Endresen, Everett, WA (US)

(73) Assignee: Amazon Technologies, Inc., Reno, NV (US)

( * ) Notice: Subject to any disclaimer, the term of this patent is extended or adjusted under 35 U.S.C. 154(b) by 615 days.

(21) Appl. No.: 12/415,479

(22) Filed: Mar. 31, 2009

(51) Int. Cl.
*G06Q 10/00* (2012.01)

(52) U.S. Cl.
USPC .......................................................... 705/26

(58) Field of Classification Search
USPC .......................................................... 705/26
See application file for complete search history.

(56) References Cited

U.S. PATENT DOCUMENTS

| | | | |
|---|---|---|---|
| 5,745,681 A * | 4/1998 | Levine et al. ................. | 709/200 |
| 6,070,167 A | 5/2000 | Qian et al. | |
| 7,668,821 B1 | 2/2010 | Donsbach et al. | |
| 2002/0010625 A1 | 1/2002 | Smith et al. | |
| 2002/0103813 A1 | 8/2002 | Frigon | |
| 2003/0105682 A1* | 6/2003 | Dicker et al. .................. | 705/27 |
| 2004/0148366 A1 | 7/2004 | Ross, Jr. et al. | |
| 2005/0009078 A1 | 1/2005 | Craford et al. | |
| 2005/0097007 A1 | 5/2005 | Alger et al. | |
| 2007/0005571 A1 | 1/2007 | Brewer et al. | |
| 2007/0078832 A1 | 4/2007 | Ott et al. | |
| 2007/0219964 A1 | 9/2007 | Cannon et al. | |
| 2007/0226077 A1 | 9/2007 | Frank et al. | |
| 2008/0021928 A1 | 1/2008 | Yagnik | |
| 2008/0065995 A1 | 3/2008 | Bell et al. | |
| 2008/0082486 A1 | 4/2008 | Lermant et al. | |
| 2008/0189336 A1 | 8/2008 | Prihodko | |
| 2008/0281684 A1 | 11/2008 | Stefanik et al. | |
| 2009/0077062 A1 | 3/2009 | Spivack et al. | |

OTHER PUBLICATIONS

U.S. Appl. No. 12/200,822, filed Aug. 28, 2008, Agarwal, et al., "Enhancing and Storing Data for Recall and Use".
U.S. Appl. No. 12/203,634, filed Sep. 3, 2008, Gulten, et al., "Facilitating Review of Products Considered for Purchase".
Dogma London Virtual Dressing Room, retrieved on Jun. 12, 2008 at <<http://www.dogmalondon.com/dressing. html>>, Dogma London, Inc., 2006, 2 pgs.
KnickerPicker The Online Dressing Room, retrieved on Jun. 12, 2008 at <<http://www.knickerpicker.com/dressing-room. asp?results=27&Type=Brand&BNm=La%20Senza>>, KnickerPicker, Ltd., 2008, 1 pg.
My Virtual Model—Virtual Dressing Room, retrieved on Jun. 12, 2008 at <<http://www.mvm.com/en/solutions.htm>>, My Virtual Model Inc., (2001-2006), 4 pgs.
Score American Soccer Virtual Dressing Room, retrieved on Jun. 12, 2008 at <<http://www.scoresports.com/vdr.php>>, Score American Soccer Company, Inc., 2007-2008, 2 pgs.
U.S. Appl. No. 11/782,633, filed Jul. 24, 2007, Desjardins, et al., "Customer-Annotated Catalog Pages".

(Continued)

*Primary Examiner* — Shay S Glass
(74) *Attorney, Agent, or Firm* — Lee & Hayes, PLLC

(57) ABSTRACT

Techniques for enabling users to acquire multiple items or information about multiple items that appear within an image are described herein. For instance, a user may provide (e.g., upload) or may otherwise find an image that contains multiple items. The user may then request to acquire some or all of the multiple items or may request information regarding some or all of the illustrated items. In some instances, the described techniques initiate acquisition of the elements in accordance with a determined preference of the user.

31 Claims, 10 Drawing Sheets

(56) References Cited

OTHER PUBLICATIONS

U.S. Appl. No. 11/954,971, filed Dec. 12, 2007, Desjardins, et al., "Surfacing Related User-Provided Content".

Blog at WordPress.com, "H&M Virtual Dressing Room", retrieved on Jun. 12, 2008, 2 pgs.

"H&M—Dressing Room", retrieved on Mar. 4, 2009 at <<http://www.hm.com/gb/inspiration/dressingroom_dressingroom2.nhtml>>H&M Hennes Ltd., Copyright H & M Hennes & Mauritz AB 2007, 1 pg.

Mukherjea, et al., "Amore: A World Wide Web Image Retrieval Engine", Baltzer World Wide Web (online). vol. 2, No. 3, 1999, retrieved from the internet at http://www.springerlink.com/content/v257668q1jm0862h/fulltext.pdf on Sep. 11, 2010, pp. 115-132.

Business/Technology Editors, Business Wire. "Introducing I ShopHere—The World's Fastest and Easiest Way to Shop Online", retrieved on Aug. 3, 2011 at http://proquest.umi.com/pqdweb?did=42217221&sid=9&Fmt=3&clientId=19649&RQT=309&VName=PQD, Business Wire, Jun 8, 1999, 5 pages.

"Facebook Photos Infrastructure", The Facebook Blog, retrieved on Jul. 11, 2011 at <<http://blog.facebook.com/blog.php?post=2406207130>>, 2 pages.

"How to tag photos in Facebook", eHow.com, retrieved on Jul. 11, 2011 at <<http://www.ehow.com/how_4816174_tag-photos-facebook.html>>, 2 pages.

Non-Final Office Action for U.S. Appl. No. 11/782,633, mailed on May 13, 2011, Chad Desjardins, "Customer Catalogs-Annotated Guides".

* cited by examiner

ACQUIRING MULTIPLE ITEMS IN AN IMAGE

RELATED APPLICATIONS

This application is related to U.S. patent application Ser. No. 11/782,633, filed on Jul. 24, 2007, entitled CUSTOMER-ANNOTATED CATALOG PAGES and incorporated herein by reference in its entirety.

This application is also related to U.S. patent application Ser. No. 11/954,971, filed on Dec. 12, 2007, entitled SURFACING RELATED USER-PROVIDED CONTENT and incorporated herein by reference in its entirety.

BACKGROUND

In both traditional brick-and-mortar stores and e-commerce sites, customers often purchase or otherwise consume multiple items that relate or somehow complement one another. For instance, a user shopping at a brick-and-mortar clothing store may see a clothed mannequin donning multiple pieces of clothing for sale, such as pants, a belt, a shirt, a jacket, and a hat. If the customer likes the entire outfit, the customer may search the store for each of these items in order to replicate this outfit. Similarly, if a customer visits an online furniture store, the customer may see an attractive bedroom set that interests the customer. The customer may again choose to purchase each of these items for decorating the customer's own bedroom. However, while these situations illustrate instances where the customer may purchase a desired group of items, the customer may wish to purchase or otherwise obtain information about many other groups of items.

As such, companies continue to explore techniques to enable customers and other users to more easily acquire desired groups of items or information about desired groups of items.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
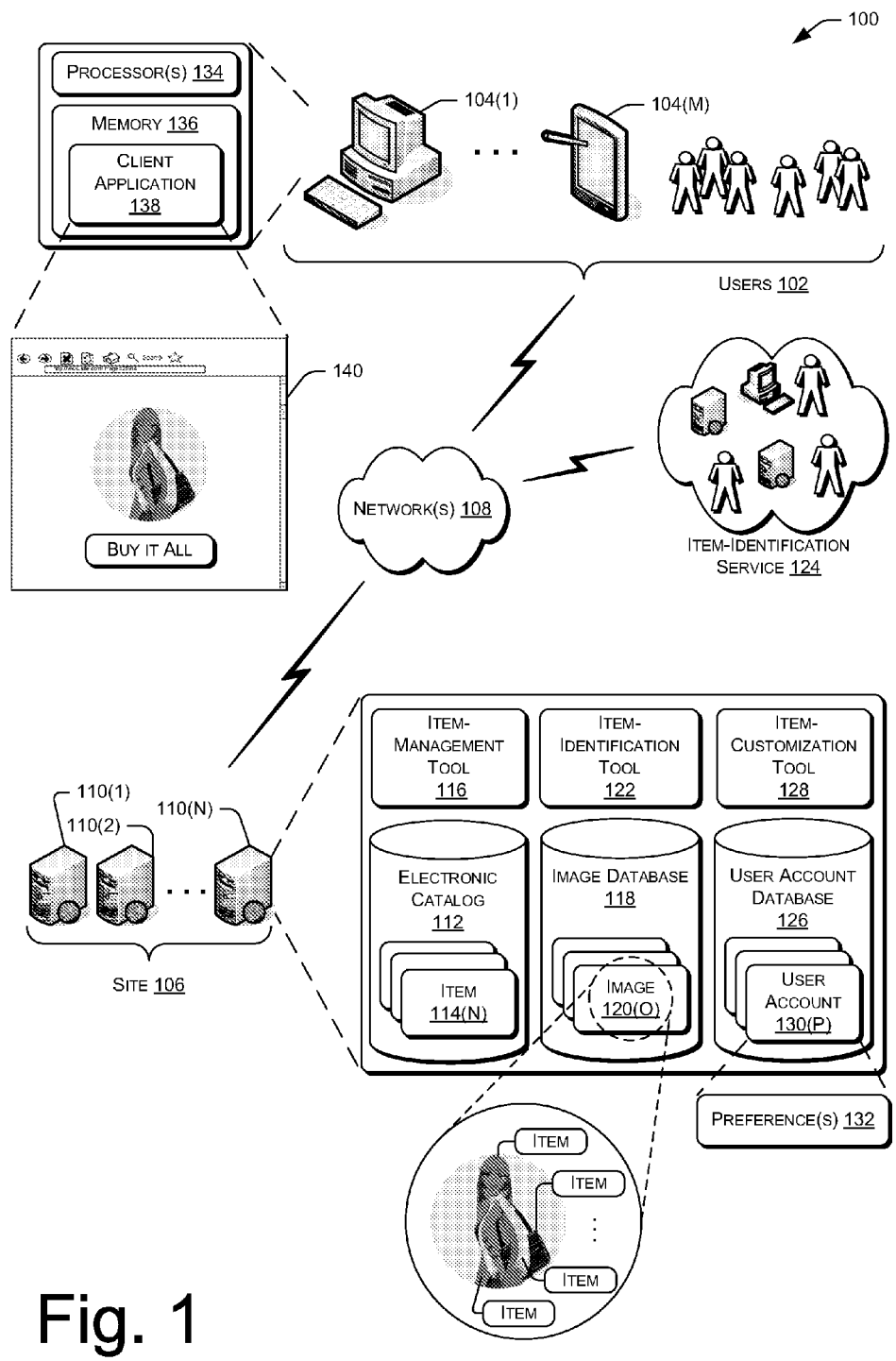
FIG. 1 illustrates an example architecture for allowing users to acquire multiple items or information about multiple items illustrated within an image. Here, multiple users connect via a network to a site that hosts an electronic catalog of items.

Embodiments of the present disclosure are directed to, among others, enabling users to acquire multiple elements or information about multiple elements that appear within an image. As an overview, an element may be a product, a service, a sellable unit, a user profile, customer-created content (e.g., artwork), or anything else that an image may somehow illustrate. An image, meanwhile, may comprise a digital photograph, an animation, a portion of a video, or any other type of image. A user may provide (e.g., upload) or may otherwise find an image that contains multiple elements. The user may then request to acquire some or all of the multiple elements or may request information regarding some or all of the illustrated elements. In some instances, the described techniques initiate acquisition of the elements or the information in response to a single user input.

In some instances, a user uploads to a site an image that illustrates one or more elements. In other instances, an operator of the site or another user provides the image. The user, another user of the site, the site operator, or some other entity may then identify some or all of the elements illustrated within the image. That is, these users and/or entities may tag the image or portions of the image as relating to a particular element. Additionally or alternative, these users may tag the image or portions of the image as relating to an alternative of an illustrated element. These users and/or entities may also annotate the image or portions of the image by, for example, providing comments or associating the image with one or more links to pieces of content. For instance, if the image illustrates multiple elements within an electronic catalog, then users and/or other entities may associate each of these elements with a link to a respective element or an alternative element within the electronic catalog.

In one example, a user may upload an image that illustrates multiple items that the user wishes to acquire. For instance, the user may upload to a site a digital photograph of a person wearing certain articles of clothing that the user wishes to purchase. Some or all of these articles of clothing may be available for purchase from an electronic catalog of the site and/or from other electronic catalogs hosted by other sites. Additionally or alternatively, items that are different but related to the illustrated items may be available for purchase from the electronic catalog. In either instance, once the user uploads the digital photograph, the user may herself associate the illustrated articles of clothing with respective items in the electronic catalog. That is, for each of multiple illustrated articles of clothing, the user may create an association between this illustrated item and an item in the electronic catalog. This latter item may comprise the same piece of clothing, a similar piece of clothing, or any other item. Additionally or alternatively, another user of the site or the site itself may create the associations between the illustrated articles of clothing and respective items in the electronic catalog.

In either instance, the user may then request to acquire (e.g., purchase, lease, rent) the items or in the electronic catalog that have been associated with the items illustrated in the image. In some instances, the site may determine one or more preferences of the user and may take these preferences into account when initiating the acquisition of these items. The site may then initiate acquisition of the purchase by placing the items in the shopping cart of the user or even executing the purchase in response to the request.

In the current example, the user, another user, or the site may have associated each article of clothing illustrated in the image with a corresponding article of clothing in the electronic catalog. That is, if the person in the image was wearing a particular jacket, then the user may have associated the image with the same particular jacket in the electronic catalog. Therefore, when the user requests to initiate purchase of the items associated with the illustrated items, the site may enable the user to purchase the actual items illustrated in the image. The site may also determine preferences and fulfill the request in accordance with these preferences. For instance, the site may determine that the user wears a size medium jacket and, as such, the site may initiate acquisition of the illustrated jacket in a size medium.

Furthermore, in some instances the site may also allow the user to choose between the items that have been associated with the illustrated items and items that have been deemed alternative to these associated items. For instance, the site may allow the user to choose between the particular jacket illustrated in the image and a jacket that is similar to but less expensive than the particular illustrated jacket.

With use of the described techniques, a user may upload or otherwise find an image that contains items that the user desires. The user may then request to purchase these or similar items. In the example given above for instance, the user may find a digital photograph of a celebrity and may request to purchase all of the items that the celebrity adorns in the photograph, including clothes, jewelry, accessories, and the like. In another example, the user may upload an image of a bicycle that has been accessorized with multiple items, such as fenders, a headlight, and a basket. The user may upload this picture and request to buy each of the illustrated items or alternatives to the illustrated items. In still another example, a user may upload a picture of a wedding, with the picture illustrating a particular church, a wedding dress, and flowers. The user may then request information about each of these illustrated elements, such as where the church resides or find similar churches to the illustrated church that are located near to the user. The user could also request information about where to acquire the flowers and/or the dress, or may actually request to acquire these items.

In each of these instances, the site may determine information about the user that can be used in suggesting items to the user. For instance, the site may determine a jacket size associated with the user and, in response to the user requesting to purchase the items adorned by the celebrity in the image, the site may suggest that the user purchase the jacket in the user's size. Furthermore, if the site knows that the user prefers generic items over name brand items, the site may suggest that the user purchase a similar jacket rather than the exact jacket. Additionally, if the site knows that the user prefers green accessories, then the site may suggest that the user purchase green fenders for the user's bicycle. In the wedding example, the site may determine a location of the user and may return a listing of churches that are similar to the illustrated church yet nearby the user.

The discussion begins with a section entitled "Illustrative Architecture," which describes a non-limiting environment in which users may request to initiate acquisition of multiple items or information about multiple items that are illustrated in an image. Next, a section entitled "Illustrative User Interfaces" follows and describes examples of user interfaces (UIs) that may be served to and rendered at the devices of the users of FIG. 1. A section entitled "Illustrative Tools" then describes example tools for implementing the described techniques. Finally, the discussion concludes with a section entitled "Illustrative Processes" and a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative architecture 100 in which techniques for acquiring multiple items or information about multiple items that appear within an image may be implemented. In architecture 100, one or more users 102 utilize computing devices 104(1), . . . , 104(M) to access a site 106 of a service provider via a network 108. Network 108 may include any one or combination of multiple different types of networks, such as cable networks, the Internet, and wireless networks. While the illustrated example represents users 102 accessing site 106 over network 108, the described techniques may equally apply in instances where users 102 interact with a service provider over the phone, via a kiosk, or in any other manner. It is also noted that the described techniques may apply in other client/server arrangements (e.g., set-top boxes, etc.), as well as in non-client/server arrangements (e.g., locally-stored software applications, etc.).

As described briefly above, site 106 may allow users 102 to upload or otherwise navigate to images and request to obtain multiple items illustrated by the image. Site 106 may also allow users 102 or another entity to identify items within these images such that users may request to obtain these identified items. In some embodiments, users 102 request to obtain information about the identified items in addition or in the alternative to requesting the actual identified items. In both of these instances, site 106 may take into account information associated with a requesting user when fulfilling the request of the user.

One or more servers 110(1), 110(2), . . . , 110(N), perhaps arranged in a cluster or as a server farm, host site 106. Other server architectures may also be used to host the site. Site 106 is capable of handling requests from many users and serving, in response, various user interfaces that can be rendered at user computing devices 104(1)-(M). Site 106 can be any type of site that supports user interaction, including online retailers, informational sites, social networking sites, blog sites, search engine sites, news and entertainment sites, and so forth. As discussed above, the described techniques can similarly be implemented outside of site 106.

In the illustrative environment, site 106 hosts an electronic catalog 112 that includes one or more items 114(1), . . . , 114(N). An item includes anything that site 106 offers for purchase, rental, subscription, viewing, informative purposes or some other form of consumption. In some embodiments, the item may be offered for consumption by site 106, while in other embodiments, site 106 may host items that others are offering using the site. An item can include a product, a service, a digital download, a news clip, customer-created content (e.g., a customer review), information, or some other type of sellable or non-sellable unit.

Electronic catalog 112 is accessible, directly or indirectly, by one or more of servers 110(1)-(N). Each item 114, meanwhile, represents an associated physical or digital item and, as such, electronic catalog 112 may store information about each associated item. For items such as books or music CDs, for example, electronic catalog 112 may contain a description, images of the product, author/artist names, publication data, pricing, shipping information, and so forth. For other types of items, electronic catalog 112 may contain different information appropriate for those items.

An item-management tool 116 facilitates access to and management of items 114 in electronic catalog 112. Item-management tool 116 allows the site operators to add or remove items to electronic catalog 112, and generally maintain control of the items offered on site 106. When a user requests information on an item from site 106, one or more of servers 110(1)-(N) retrieve the item information from electronic catalog 112 and serve a user interface (UI) containing the information to the requesting user computing device. Electronic catalog 112 may therefore contain static UIs that are pre-generated and stored prior to such requests, or may alternatively store data that is used to populate dynamic UIs that are generated in response to such requests.

As illustrated, site 106 also stores or otherwise has access to an image database 118. Image database 118 stores or otherwise has access to one or more images 120(1), . . . , 120(O). Images 120(1)-(O) may comprise any sort of file that visually represents content, such as a digital photograph, a portion of a video, an animation or any other file or portion of a file that user 102 can visually consume. Each of images 120(1)-(O) may illustrate one or more items that are available for consumption from electronic catalog 112 and/or from another electronic catalog. In addition to illustrating one or more items, each of these items illustrated by an image may have been previously identified as residing within the image.

To allow for identification of the illustrated items, servers 110(1)-(N) also store or have access to an item-identification tool 122. Item-identification tool 122 enables users 102, an operator of site 106, or some other entity such as an item-identification service 124 to identify items illustrated within images 120(1)-(O) and/or other items that are related to the illustrated items. For instance, tool 122 may allow users to associate a particular image that illustrates a particular item with a corresponding item in electronic catalog 122. Additionally or alternatively, tool 122 may allow users 102 to associate the particular image with an item that is similar to but different than the particular illustrated item.

In some instances, tool 122 allows a user to associate an area that approximately frames an illustrated item with a respective item in electronic catalog 112. For instance, the user may associate this area with the same item in the electronic catalog, an item that is less expensive but similar to the illustrated item, or any other type of item. In each instance, the user may make this association in a manner that is similar or different to the techniques described in U.S. patent application Ser. No. 11/782,633, incorporated by reference above. When fulfilling a user's request to acquire multiple items or information about multiple items illustrated in a particular image, site 106 may take into account information associated with the user who submits the request. As such, site 106 also stores or otherwise has access to a user-account database 126 and an item-customization tool 128. User-account database 126 stores or otherwise has access to one or more user accounts 130(1), . . . , 130(P), each of which is associated with a respective user of users 102.

Each of these accounts, meanwhile, includes one or more preferences 132 associated with a corresponding user. Preferences 132 may include any information about a user that could be helpful in fulfilling a user's request for items or for information about particular items. Further, preferences 132 may be information that a corresponding user explicitly supplied and/or information that site 106 determined after monitoring a behavior of the corresponding user. Preferences 132 may include an item size that the user prefers, an item color, a brand, a format, a shipping address, a digital location, or any other information that may be helpful in completing a request for a particular user.

Item-customization tool 128, meanwhile, merges a request from a user to obtain multiple items in an image with preference information 132 associated with the requesting user to fulfill the acquisition (e.g., purchase) or to suggest items to fulfill the acquisition. For instance, if a user requests to obtain each item that has been identified in an image, and each item comprises an article of clothing, then item-customization tool 128 may initiate acquisition of these illustrated items in a size (e.g., "medium") associated with the user.

Taken together, FIG. 1 allows users 102 and/or other actors to associate images 120(1)-(O) with items 114(1)-(N) in electronic catalog 112 for the purpose of allowing users 102 to acquire each of the illustrated items or information about these items. To illustrate, envision that one of users 102 operates client computing device 104(1) to upload an image 120 (O) of a woman wearing a hat, a jacket, a scarf and carrying a purse. While FIG. 1 illustrates device 104(1) as a personal computer, other client computing devices may include laptop computers, portable digital assistants (PDAs), mobile phones, set-top boxes, game consoles, and so forth. In each instance and as illustrated, each user computing device is equipped with one or more processors 134 and memory 136 to store applications and data, such as a client application 138 that enables access to site 106.

Once the user uploads the image to site 106, other users 102, site 106 or service 124 may identify the items illustrated by the image or items related to these illustrated items. For instance, these actors may associate the uploaded image with corresponding items in electronic catalog 112 and/or with items that are similar to, but less expensive than the illustrated items. These actors could also associate the image with items that are similar to, but superior to the illustrated items. For instance, the illustrated hat may be associated with the same hat within electronic catalog 112, while the illustrated jacket may be associated with a jacket that is similar to but less expensive than the illustrated jacket. The purse, meanwhile, may be associated with the same purse in electronic catalog 112 as well as a purse that is superior to the illustrated purse.

In any of these instances, once items within an image have been identified and mapped to items in electronic catalog 112, the user who uploaded the image or any other user may request to acquire (e.g., purchase) multiple items illustrated that have been associated with the image. For instance, a user may request to purchase each item illustrated by the uploaded image. In response to this request, site 106 may determine preferences associated with the requesting user and may use this information to initiate acquisition of the items within electronic catalog 112 that have been associated with image 120(O).

Illustrative User Interfaces

Figure 2:
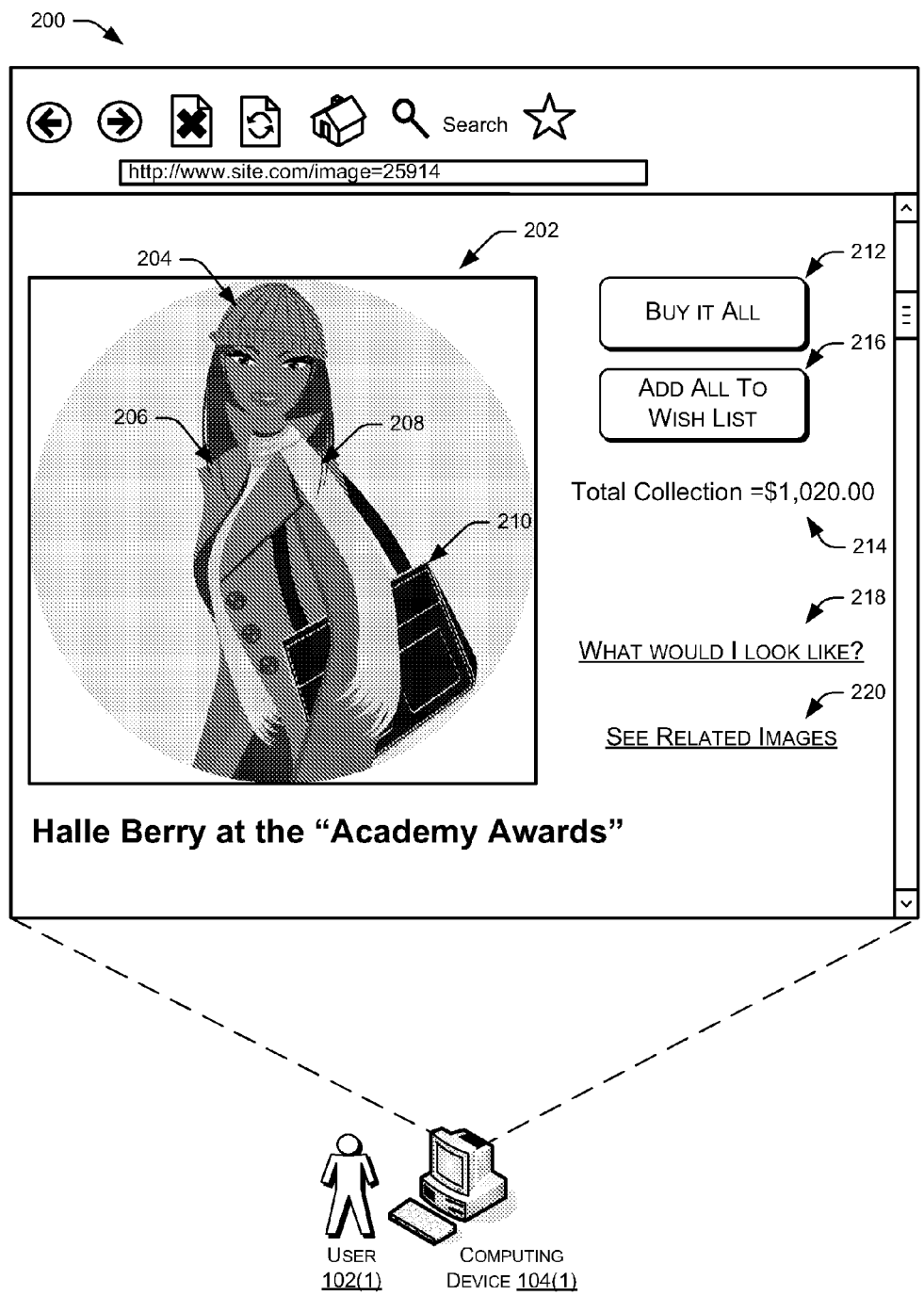
FIG. 2 illustrates an example user interface (UI) that the site of FIG. 1 may serve. This UI includes an image illustrating multiple items found within the electronic catalog as well as an icon that, when selected, allows a user to purchase each of the multiple illustrated items.

FIG. 2 represents an illustrative user interface 200 that site 106 may serve to computing device 104(1) of one of users 102. Here, user interface 200 includes an image 202 that illustrates multiple items, each of which have previously been associated with one or more items within electronic catalog 112 and/or within one or more other electronic catalogs. As discussed above, image 202 may comprise a digital photograph, a portion of a video file, an animation, or any other type of content that can visually represent one or more items.

Here, image 202 comprises a digital photograph a celebrity and, more particularly, a photograph of Halle Berry at the Academy Awards. One of users 102, site 106, or another entity may have provided this image. As illustrated, image 202 illustrates a hat 204, a jacket 206, a scarf 208 and a purse 210. Users 102, item-identification service 124, site 106 or another entity may have associated each of items 204-210 with an item in electronic catalog 112 and/or in one or more other electronic catalogs.

For instance, these actors may have associated each item with a corresponding item in electronic catalog 112. To illustrate, hat 202 may be associated with the same hat offered for purchase from electronic catalog 112. As such, image 202 may be tagged as being associated with this item in the electronic catalog. Additionally or alternatively, an area that approximately frames hat 204 may be associated with a link to a page associated with hat 204. For instance, this area may be associated with a link to a page that includes details of hat 204, reviews of hat 204 or any other page that somehow relates to the illustrated hat.

While hat 204 may be associated with the same hat within electronic catalog 112, illustrated hat 204 may additionally or alternatively be associated with another item in electronic catalog 112. For instance, one of users 102 may have previously associated hat 204 (and, hence, image 204) with an item that the user feels is an alternative to the illustrated hat. This user may have, for example, associated illustrated hat 204 with a hat that is similar but less expensive, or similar but purportedly superior to the illustrated hat. Illustrated hat 204 may also have been associated with any other item within electronic catalog 112.

Each of items 206-210 may similarly be associated with one or more items in electronic catalog 112 and/or one or more other electronic catalogs. For instance, jacket 206 may be associated with the same or a different jacket within electronic catalog 112, while scarf 208 and purse 210 may similarly be associated with one or more corresponding items.

As illustrated, user interface 200 further includes functionality that allows a user to initiate acquisition of each of the items that have been associated with image 202 and/or information about these items. Here, this functionality comprises an icon 212 entitled "Buy it All" that, when selected, initiates acquisition of each of the associated items or information about these items. User interface 200 may also indicate a price 214 of the illustrated collection of items. As discussed above, site 106 may initiate acquisition of the items in response to a user selection of icon 212 in accordance with one or more preferences of a requesting user. For instance, site 106 may determine an item size of the user, a preferred color of the user, a preferred brand of the user, or any other information about the user. With this information, site 106 may initiate acquisition of the items by, for instance, directing the user through a checkout process to purchase the items with the preferences (e.g., sizes, colors, etc.) of the user.

User interface 200 may also include an icon 216 entitled "Add All to Wish List." When the user selects icon 216, site 106 may add each item that has been associated with image 202 onto a list of desired items of the requesting user. The user may use this list to track items that the user desires, while other users may also use this list when deciding on a particular item to gift to the user.

In the illustrated embodiment, user interface 200 also includes a link 218 ("What Would I Look Like?") and a link 220 ("See Related Images"). In response to a user selection of link 218, site 106 (or another site) may attempt to cause display of what the particular user would look like if the user were accessorized with the items that have been associated with image 202. To do so, site 106 may first determine which items have been associated with the image and may mine corresponding images of these items from electronic catalog 112 and/or from one or more other electronic catalogs. Then, site 106 may attempt to find one or more images of the user by, for example, examining a corresponding user account of the user, by searching the Web, by requesting that the user upload an image, or in any other manner.

With these images, site 106 may create and serve a user interface that illustrates the items overlaid onto the image of the user. By doing so, the user is able to view how she would look in hat 204, jacket 206, scarf 208 and purse 210, if these items have been associated with image 202. In some instances, the items may be displayed in accordance with the preferences of the user (e.g., a green scarf, a size medium jacket, etc.).

In other instances, selection of link 218 may cause site 106 to cause display of how another user that is different from the requesting user would look in these items. For instance, a husband may wish to view how his wife would look in the illustrated items. Here, the requesting user may specify a name or other identifying information of the person that he wishes to view in the items.

Furthermore, in instances where the illustrated image does not comprise articles of clothing, selection of link 218 may allow the user to view the items overlaid something other than an image of the user. Returning to the example where image 200 comprises an accessorized bicycle, link 218 may be entitled "How Would My Bike Look?" By selecting this link, site 106 would again attempt to locate the items that have been associated with the image (e.g., the fenders, the headlight, and the basket). Here, however, site 106 may then attempt to locate an image of the user's bicycle. Again, site 106 may analyze a user account of the user or may request that the user upload an image of his or her bicycle. Within these images, site 106 may then create and serve a user interface that illustrates the user's bicycle when it is accessorized with the items that have been associated with the image.

Responsive to selection of link 220, meanwhile, site 106 may serve one or more images that have been determined to be related to image 202. Images may be related based on a number of common items associated between the images, based on other content of the image (e.g., whether the image is of a person and, if so, whom), based on input from users 102 or item-identification service 124, or in any other matter. Finally, while FIG. 2 illustrates example icons and links, it is to be appreciated that other implementations may include more or fewer similar or different icons and links.

Figure 3:
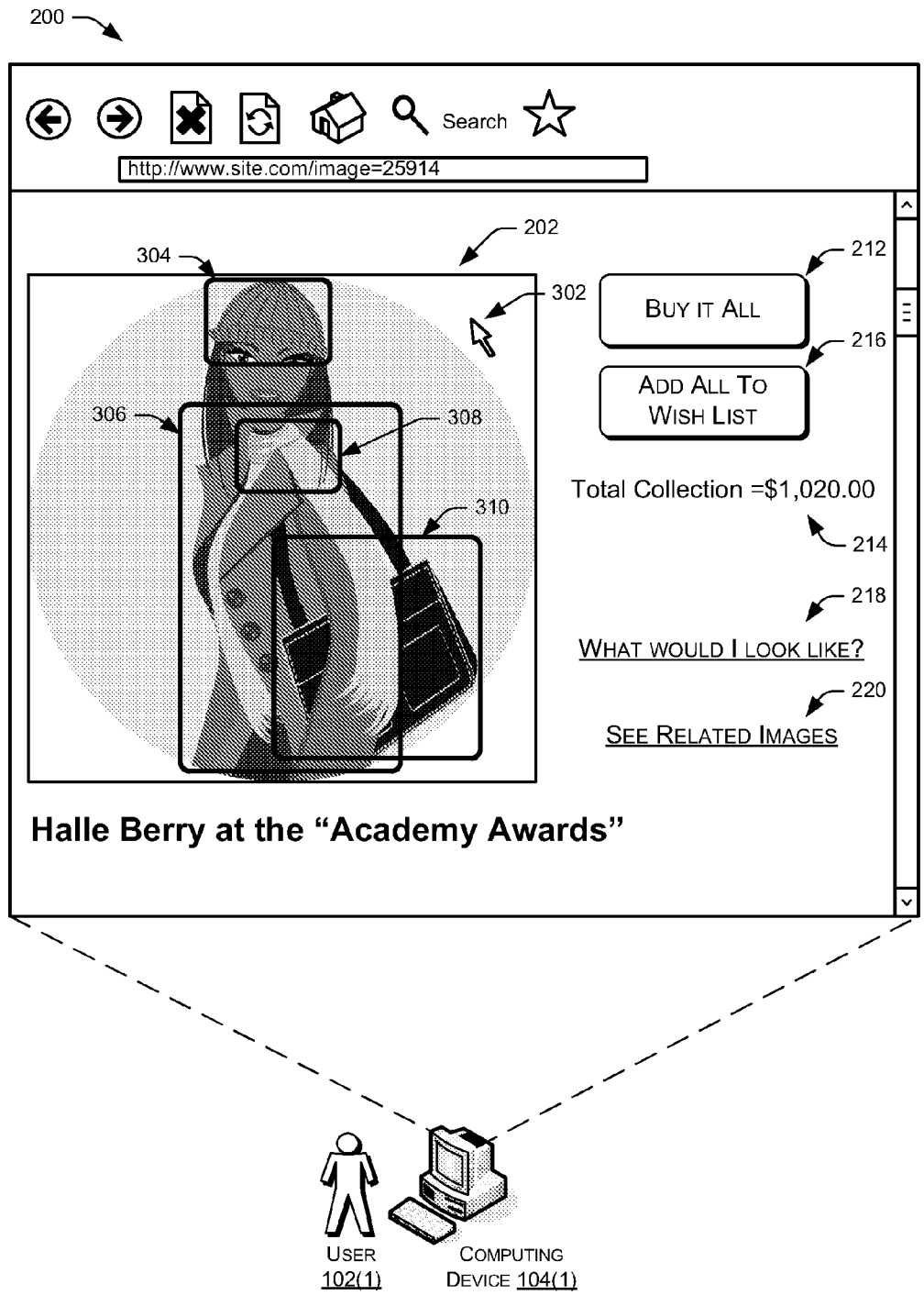
FIG. 3 illustrates the example UI of FIG. 2 after a user has selected the image by, for example, causing a cursor to hover over the image. In response, the UI highlights or otherwise identifies those items in the image that have been identified as residing within the electronic catalog.

FIG. 3 illustrates user interface 200 after the user has placed a cursor 302 of an input device over image 202. In response, user interface 200 illustrates a corresponding highlight 304, 306, 308, 310 over each of items 204-210. By doing so, user interface 200 communicates to the user which illustrated items have been associated with one or more items in electronic catalog 112 and/or with one or more items in another electronic catalog. As discussed above, highlights 304-310 may also indicate that the corresponding area of image 202 has been associated with a link to a page that is associated with the illustrated item and/or with a related item.

In some instances, user interface 200 may also display other content in response to the user placing cursor within one of highlights 304-310. For instance, responsive to the user placing cursor 302 into an area defined by highlight 304, site 106 may cause display of details about the item that has been associated with this area (e.g., details such as price and availability of the corresponding purse in electronic catalog 112). Site 106 may additionally or alternatively display user reviews of the illustrated item and/or the item that has been associated with the illustrated item and/or any other content about the item or about the entity that associated the illustrated item with an item in an electronic catalog.

Figure 4:
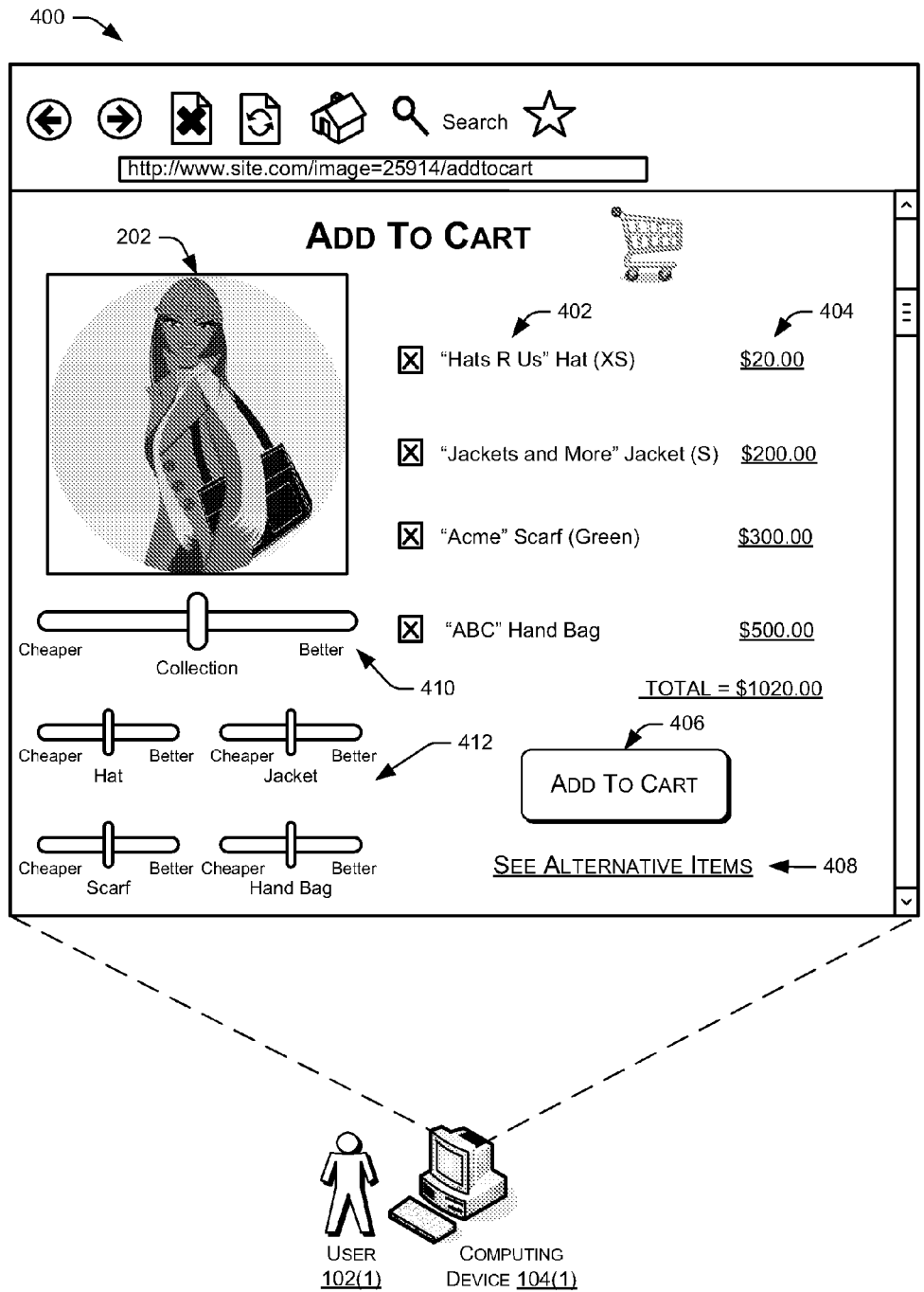
FIG. 4 illustrates an example UI that the site may serve in response to the user selecting the icon to purchase the illustrated items from the UI of FIG. 2 or 3. As illustrated, the site allows the user to place each identified item into the user's shopping cart in response to this single user input.

FIG. 4 illustrates an example user interface 400 that site 106 (or another site) may serve in response to the user selecting icon 212 from the UI of FIG. 2 or 3. As illustrated, the site allows the user to place each item in electronic catalog 112 that has been associated with image 202 into a shopping cart of the user. In some instances, site 106 serves user interface 400 in response to a single user input, such as selection of icon 212. Furthermore, while interface 400 allows the user to place the items into a shopping cart of the user, other implementations may initiate acquisition of these items in other ways. For instance, other implementations may automatically place the items into the cart of the user or may simply initiate and complete the acquisition in response to the selection of icon 212.

In the illustrated example, each of items 204-210 illustrated in image 202 have been associated with the same item in electronic catalog 112. That is, the illustrated hat has been associated with the same hat in electronic catalog 112, the illustrated jacket has been associated with the same jacket, and so on and so forth. As such, a user may truly request to buy the illustrated collection of items via selection of icon 212. As such, user interface 400 includes a list 402 of each of the items illustrated in and associated with image 202. This UI also includes a list 404 of prices of these individual items as well as a price of the collection of items.

User interface 400 allows the user to add all or a portion of the listed items in a shopping cart of the user with the use of checkboxes and an icon 406. While the illustrated example illustrates checkboxes, it is to be appreciated that the user may select and deselect items to add to the shopping cart in any other suitable manner.

User interface 400 may also include an link 408 ("See Alternative Items") that, when selected, allows the user to see items that are related to the items in list 402. For instance, site 106 may serve to the user information about items that users 102 have deemed as alternatives to the illustrated items or items that have been deemed alternatives by site 106 within electronic catalog 112. For instance, selection of link 408 may allow the user to select items that are less expensive than the illustrated items, superior to the illustrated items, of a different brand than the illustrated items, or items that comprise alternatives in any other way.

In addition or in the alternative to link 408, user interface 400 may include one or more sliders that, when manipulated (e.g. click-and-drag, etc.) by user 102(1), causes display of alternative items and/or alternative collections of items. For instance, user interface 400 here includes a slider 410 for the entire collection of items that image 202 illustrates. User 102(1) may manipulate slider 410 to view cheaper collections of items or, alternatively, to view better (and, likely, more expensive) collections of items. When user manipulates slider 410, user interface 400 may display other images that have been tagged as having similar but cheaper items than image 202. Alternatively, user interface 400 may simply overlay images of the cheaper items onto image 202. In either of these instances, user interface 400 may alter the list of items 402 (and corresponding prices 404) to reflect the cheaper items. User interface 400 may similarly change in response to user 102(1) manipulating the slider to view "better" items.

Additionally, user interface 410 may include a group of sliders 412 corresponding to each of the items tagged within image 202. For instance, sliders 412 may include a slider for the illustrated hat, jacket, scarf and hand bag. Again, user 102(1) may manipulate sliders 412 to view cheaper or better individual items. In response to these choices, user interface may display these differing items over image 202 or, conversely, may attempt to find other images that best match the resulting collection of items. Again, user interface 400 may also alter the listing 402 and prices 404 of the items in the user's shopping cart in response to the user's choices made via sliders 412. Finally, it is noted that while FIG. 4 includes slider 410 and sliders 412, it is to be appreciated that some or all of the other illustrated user interfaces may include this or a similar functionality.

Figure 5:
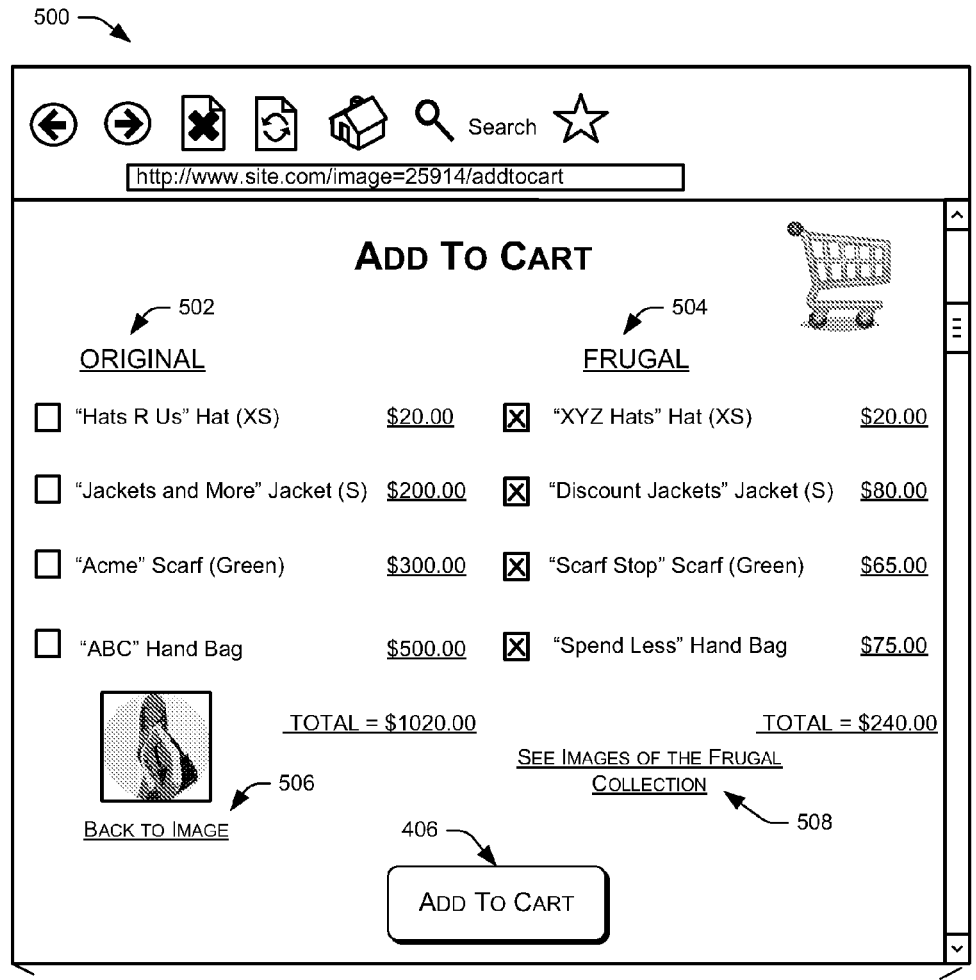
FIG. 5 illustrates another example UI that the site may serve in response to the user selecting the icon to purchase the illustrated items from the UI of FIG. 2 or 3. Here, the site allows the user to place the illustrated items or alternatives to the illustrated items into the user's shopping cart.
Figure 5:
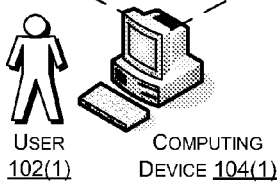

FIG. 5 illustrates another example user interface 500 that site 106 may serve in response to the user selecting the icon to acquire the illustrated items from the UI of FIG. 2 or 3. Here, user interface 500 allows the user to place into the user's cart the items illustrated in image 202, alternatives to the illustrated items, or a combination thereof. In the instant example, the UI includes a list 502 of items that exactly match the items illustrated in the image and a list 504 of items that are similar to but less expensive than the illustrated items. Again, users 102, item-identification service 124, site 106 and/or another entity may have identified the items in list 504 as similar but less expensive than the illustrated items 204-210. Here, site 106 has determined that the user who requested to initiate acquisition of the items prefers to purchase items that are similar but less expensive. As such, FIG. 5 illustrates that site 106 has made a default selection of list 504.

In addition, user interface 500 may include image 202 as well as a link 506 (entitled "Back to Image") that, when selected, returns the user to user interface 200 of FIG. 2. Additionally, user interface 500 may include a link 508 (entitled "See Images of Frugal Collection") that, when selected, causes display of one or more images relating the "frugal" collection of elements. For instance, selection of link 508 may cause display of image 202 overlaid with the frugal elements listed in list 504. Alternatively, selection of link 508 may cause display of other images that other users have uploaded having some or all of the items found within list 504. In addition to link 508, user interface 500 may include one or more actual images that include these frugal items (e.g., image 202 and/or one or more other images).

Furthermore, while user interface 500 includes alternative items that are less expensive than the illustrated items, other implementations may include one or more other lists of items that each comprises a different type of alternative item collection. These alternative collections may include items that are similar but superior to the illustrated items, items of a different color scheme than the illustrated items, items of a different collection of brands than the illustrated items, or any other alternative collection.

Figure 6:
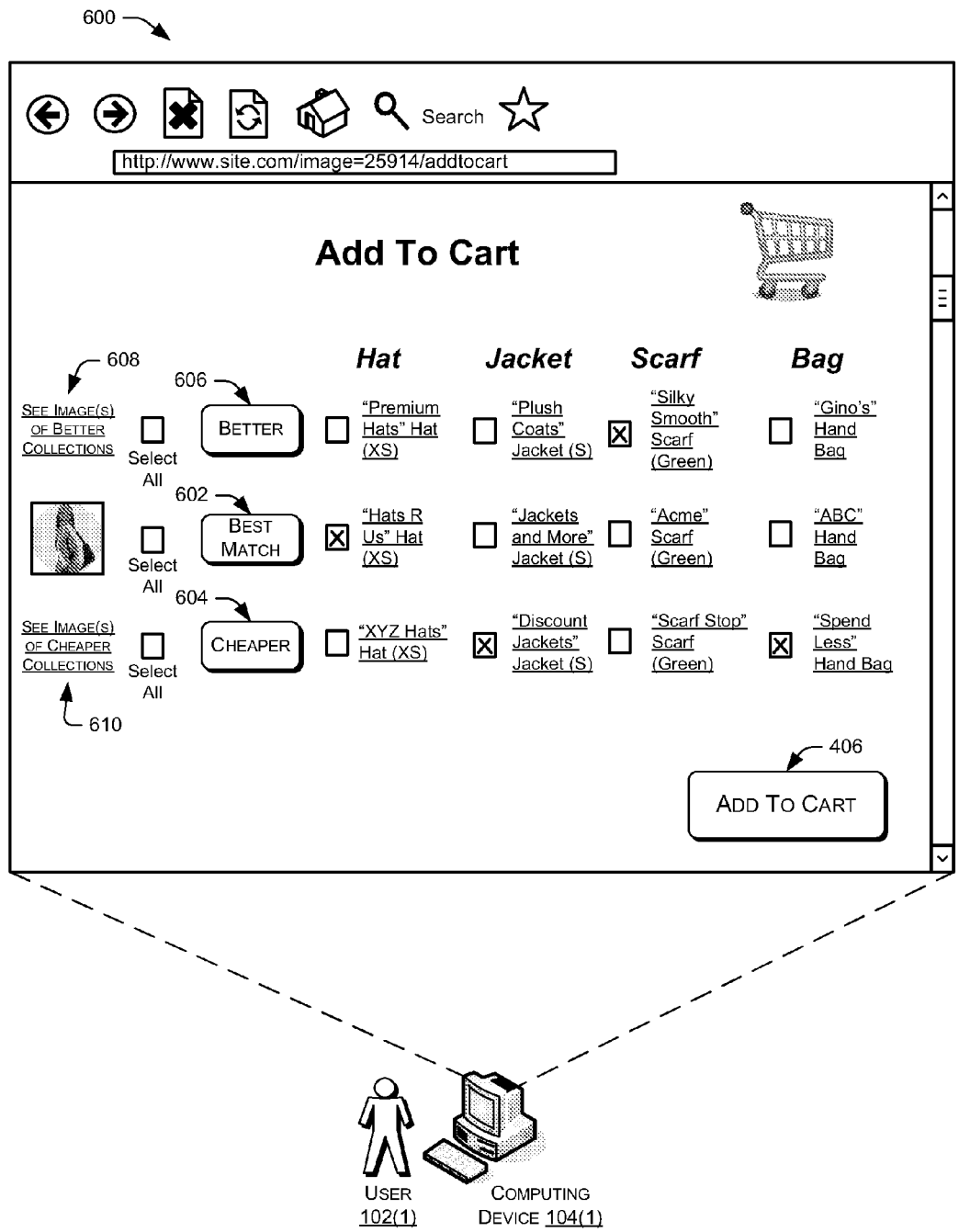
FIG. 6 illustrates yet another example UI that the site may serve in response to the user selecting the icon to purchase the illustrated items from the UI of FIG. 2 or 3. Here again, the site allows the user to place the illustrated items or alternatives to the illustrated items into the user's shopping cart.

FIG. 6 illustrates yet another example user interface 600 that site 106 may serve in response to the user selecting icon 212 to request to acquire the illustrated items from the UI of FIG. 2 or 3. Here again, site 106 allows the user to place the illustrated items or alternatives to the illustrated items into the user's shopping cart. In this instance, however, user interface 600 includes a list 602 of items that best match the items illustrated in image 202, a list 604 of items that are similar but less expensive than the illustrated items, and a list 606 of items that are similar but superior than the illustrated items. As illustrated, each of these lists includes a link to a respective item in electronic catalog 112. Additionally, other implementations may include images of these items, or may display images or other details (e.g., price, rating, etc.) when a user places a cursor over (i.e., hovers the cursor over) a respective item or otherwise selects a respective item. While this UI allows the user to select items from three example lists, it is to be appreciated that other implementations may allow the user to select items from any other number of similar or different lists.

As illustrated, user interface 600 allows the user to select items from each of lists 602-606. Additionally, this UI allows the user to select an entire list, such as the best-matching items or the less expensive items. Once the user has selected the desired items, the user may again select icon 406 to place the selected items in the shopping cart of the user.

Furthermore, user interface 600 may include images or links to images of the "best match", "better", and "cheaper" collections of items. Here, user interface 600 includes image 202, as well as links 608 ("See Image(s) of Better Collections") and 610 ("See Images of Cheaper Collections"). When user 102(1) selects link 608, site 106 may serve one or more images of collections of "better" items. As discussed above with regards to FIG. 5, these images may comprise image 202 overlaid with better items, or these images may comprise different images that other users or site 106 has previously provided. Similarly, when user 102(1) selects link 610, site 106 may serve one or more images of "cheaper" collections of items corresponding to those listed on user interface 600. Again, while user interface 600 here includes links 608 and 610, it is to be appreciated that other embodiments may actually provide images similar to image 202 for the cheaper and better item collections.

Figure 7:
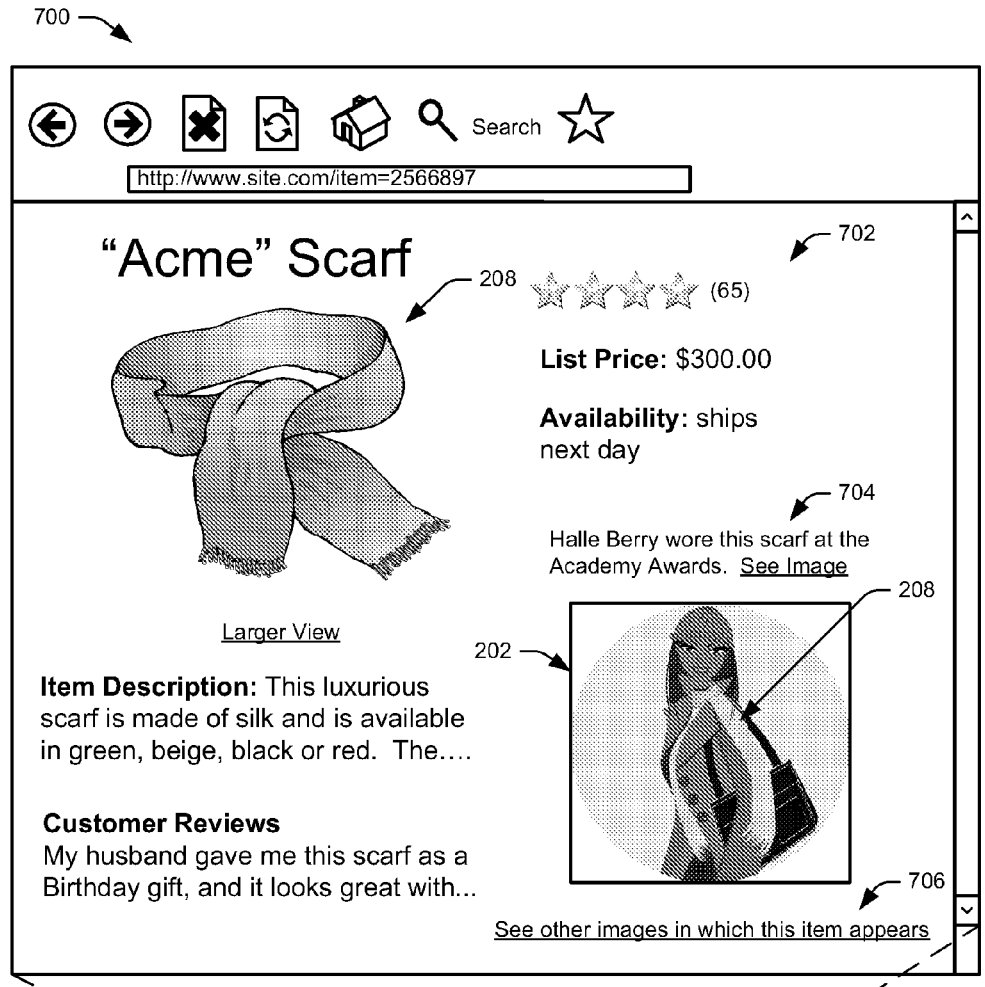
FIG. 7 illustrates an example item detail page associated with an item illustrated by the image of FIG. 2. Here, the item detail page includes an indication that the item also appears in the image of FIG. 2.
Figure 7:
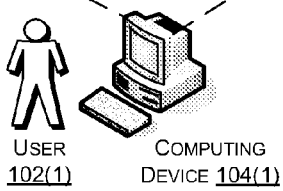

Next, FIG. 7 illustrates an example user interface 700 that includes details about a particular item that has been associated with image 202. Specifically, user interface 700 includes details about scarf 208 illustrated within the image of FIGS. 2 and 3. In this example, one of users 102, item-identification service 124, site 106 or another entity has previously associated scarf 208 with image 202.

User interface 700 also includes an indication 704 that the illustrated item (here, scarf 208) appears in image 202 of FIGS. 2 and 3. This UI also includes image 202. The user viewing user interface 700 may select a link within indication 704 and/or may select image 202 for the purpose of navigating to user interface 200. As discussed above, this user may then choose to not only request to acquire scarf 208, but also the remaining items illustrated in image 202. Finally, user interface 700 includes a link 706 ("See Other Images in Which This Item Appears") that, when selected, causes site 106 to serve one or more other images in which scarf 208 also appears. As can be appreciated, image 202 and link 706 allow the user viewing user interface 700 to view the illustrate item within a collection of items. Furthermore, if the user views a collection within an image that particularly suits the user, then the user may request to acquire this entire collection of items.

Figure 8:
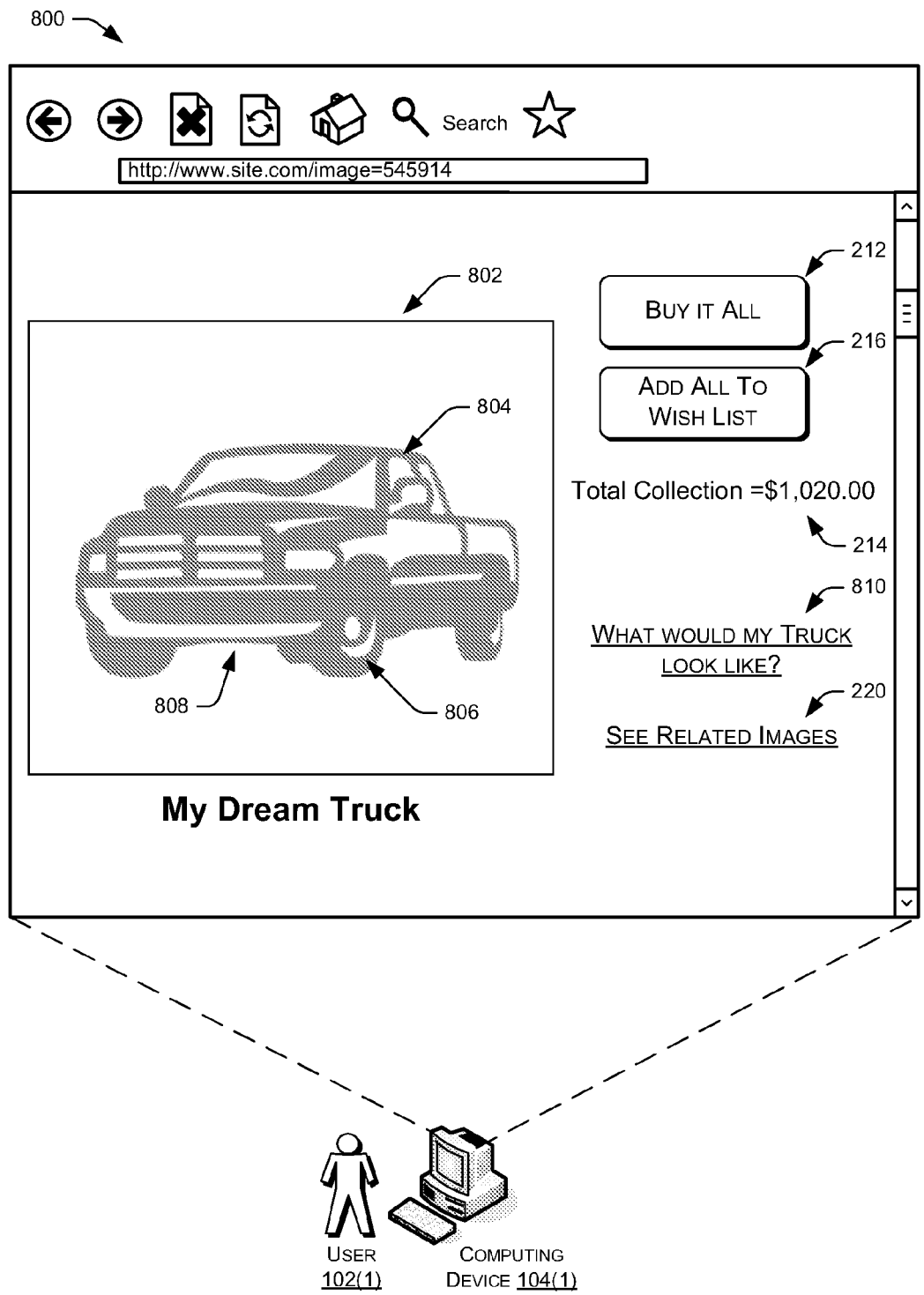
FIG. 8 illustrates another example user interface (UI) that depicting multiple items found within the electronic catalog and an icon that, when selected, allows a user to purchase each of the multiple illustrated items.

FIG. 8 illustrates another user interface 800 that site 106 may serve to computing device 104(1) of user 102(1). Here, user interface 800 includes an image that illustrates a truck and multiple other accessories that adorn the truck. Similar to image 202 from FIG. 2, each of these items has been associated with a respective item (e.g., the same item or an alternative item) in electronic catalog 112 of site 106. Specifically, image 802 has been associated with a window tinting kit 804, a set of custom wheels 806 and a lift package 808 for raising the body of the illustrated truck.

User interface 802 also includes icons 212 and 216 that, when selected, initiate acquisition of these items or adds these items to a wish list of user 102(1). Similar to each of the examples given above, however, site 106 may first determine one or more preferences associated with user 102(1) before initiating acquisition of these items. Here, site 106 may determine (e.g., by asking the user or by analyzing a user account of the user) a type of truck that user 102(1) owns or wishes to own. Site 106 may then use this information to fulfill the order for the items. For instance, site 106 may determine what size of custom wheels 806 the truck of the user can accommodate. After making this determination, site 106 may begin acquisition of the wheels (and the other items) in accordance with the determined wheel size and other preferences.

Conversely, as opposed to initiating acquisition of the items associated with image 802, user 102(1) may select a link 810 ("What Would My Truck Look Like?") in order to view what the user's truck would look like with the illustrated items. To create this image, site 106 may overlay the items onto a picture of the user's truck from the user's account. In other instances, the site may instead find an image of the user's make and model of truck via the Internet (or other network) and may manipulate this image in order to display a representation of how the user's truck would likely look if the user were to purchase the items illustrated in image 802.

Illustrative Tools

Figure 9:
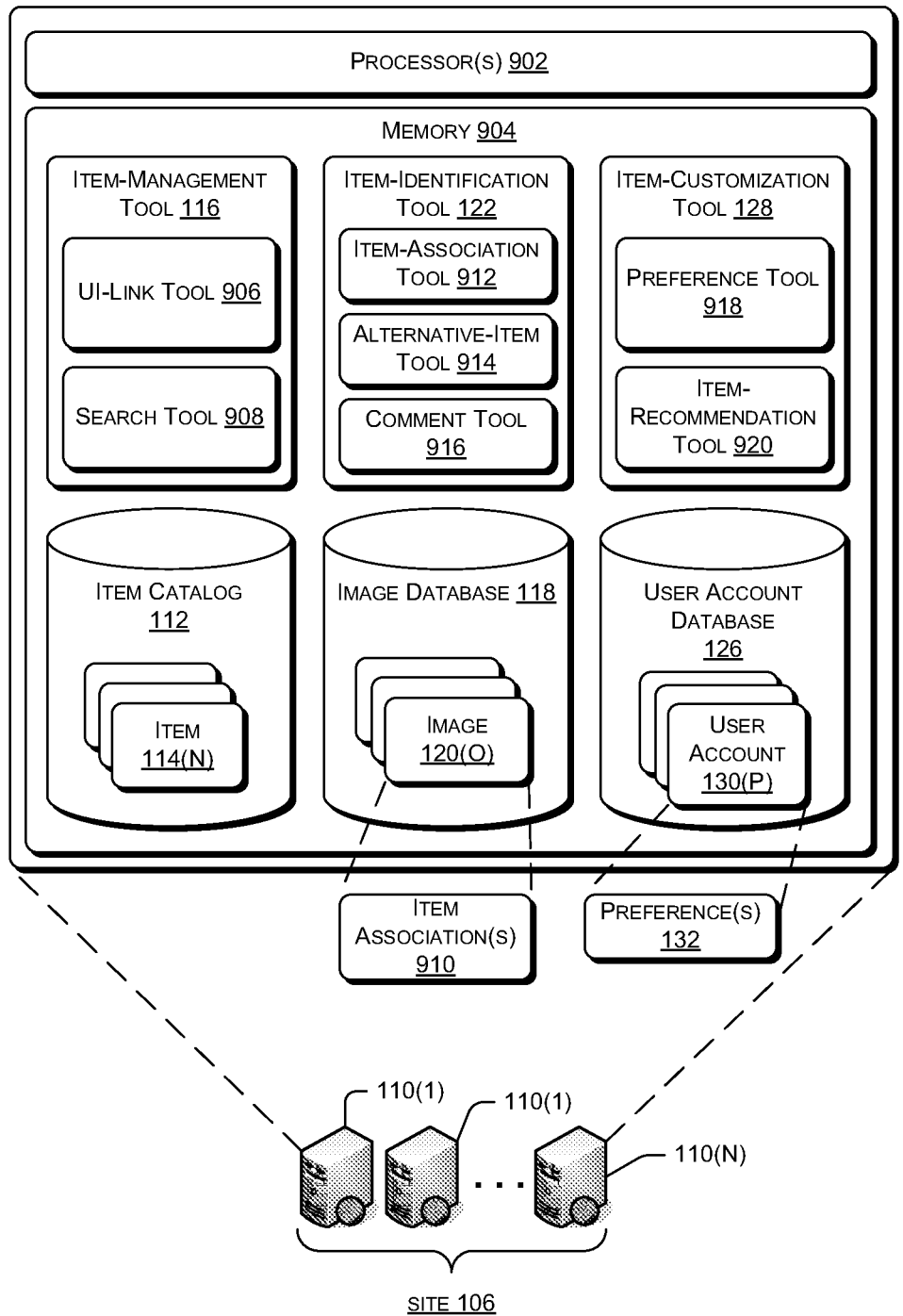
FIG. 9 is a block diagram illustrating embodiments of modules in an item-management tool, an item-identification tool, and an item-customization tool from FIG. 1.

FIG. 9 illustrates example implementations of item-management tool 116, item-identification tool 122 and item-customization tool 128 from FIG. 1. Illustrated servers 110(1)-(N) have processing capabilities and memory suitable to store and execute computer-executable instructions. In this example, server(s) 110 include one or more processors 902 and memory 904. Memory 904 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Item-management tool 116, item-identification tool 122 and item-customization tool 128 are implemented as software or computer-executable instructions stored in memory 904 and executed by one or more of processors 902. As illustrated, item-management tool 116 includes a UI-link tool 906 and a search tool 908. UI-link tool 906 maintains links to pages and other user interfaces associated with items 114(1)-(N) stored in electronic catalog 112. For instance, UI-Link tool 906 may maintain UIs that illustrated details about these items, reviews of these items, or any other pages or UIs that are somehow related to these items.

Search tool 908, meanwhile, enables a user to search items 114(1)-(N) within electronic catalog 112. Search tool 908, or another similar search tool, also enables the user to search for images 120(1)-(O) within image database 118. As illustrated and as discussed above, each of these images 120(1)-(O) may include multiple item associations 910 in response to users 102, site 106, item-identification service 124 and/or another entity associating these images with items in an electronic catalog, such as catalog 112.

Item-identification tool 122, meanwhile, includes an item-association tool 912, an alternative-item tool 914, and a comment tool 916. Item-association tool 912 allows a user to associate an image 120(O) with an item within electronic catalog 112 and/or within another electronic catalog. For instance, tool 912 allows the user to associate an item that the image illustrates with the same item in the electronic catalog. In some implementations, item-association tool 912 operates in a manner similar or the same as the techniques described in U.S. patent application Ser. No. 11/782,633, incorporated by reference above.

Alternative-item tool 914, meanwhile, allows the user to identify one or more of items that the user deems as alternatives to the items illustrated in a particular image. These alternative items may comprise similar items having different prices, colors, brands, sizes, specifications, or the like. Comment tool 916, meanwhile, enables the user to comment on an item illustrated within an image.

Finally, FIG. 9 illustrates that memory 904 includes item-customization tool 128. Item-customization tool 128 functions to tailor a user's request to acquire each item that is associated with an image with preferences of the user. For instance, if the user requests to purchase each article of clothing illustrated in image 202 of FIG. 2, tool 128 may determine clothing sizes of the user and may then initiate the purchase of these items in the determined size.

As illustrated, item-customization tool 128 includes a preference tool 918 and an item-recommendation tool 920. Item-preference tool 918 functions to determine one or more preferences associated with a user. Tool 918 may determine these preferences by querying the user or by analyzing preferences 132 within a particular user account 130(P). As discussed above, preferences 132 may comprise any sort of preference of a user, including item sizes, colors, brands, formats, and/or any other similar or different information.

With use of the determined preferences, item-recommendation tool 920 may recommend acquisition of certain tailored items to the user. Returning to the example of FIG. 2 for instance, in response to receiving a request to purchase the items associated with the image 202, tool 920 may recommend to the user that the user purchase the illustrated jacket in a size medium or in a particular color. Similarly, preference tool 918 determines that the user is generally frugal and prefers less expensive items, then item-recommendation tool 920 may recommend a similar or less expensive jacket.

Illustrative Processes

Figure 10:
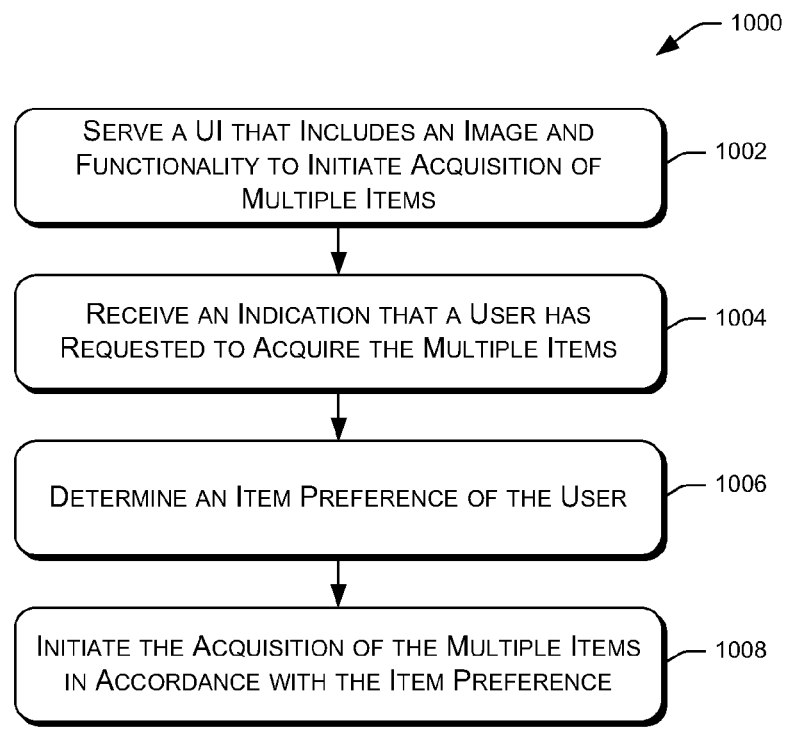
FIG. 10 is a flow diagram of an embodiment of a process for enabling a user to acquire multiple items illustrated in an image.

FIG. 10 illustrates an example process 1000 for enabling users to acquire multiple elements that appear within an image. Process 1000 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 1000 begins with an operation 1002, which represents serving a user interface that includes an image illustrating multiple items and functionality to initiate acquisition of multiple items that have been associated with the image. For instance, site 106 may serve an image such as image 202 and an icon such as icon 212. Next, operation 1004 receives an indication that the user has requested (via the functionality) to acquire the multiple items that have been associated with the image. In response, operation 1006 then determines one or more item preferences associated with the user. In the instant example, site 106 may determine a size of a jacket worn by the requesting user, for instance. Finally, operation 1008 initiates acquisition of any items that have been associated with this image. These items may include, for instance, the illustrated items, alternatives to the illustrated items, or any other combination of items. Furthermore, this operation may initiate the acquisition in accordance with the determined item preference(s) of the user by, for instance, recommending that the user purchase the illustrated jacket in a particular size of the user.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more computer-readable media storing computer-executable instructions that, when executed on one or more processors, perform acts comprising:
   serving a user interface that includes:
      a photographic image provided by a user that illustrates multiple items;
      information that is associated with the multiple items and from an electronic catalog, where each of the multiple items in the photographic image is associated with an item in the electronic catalog of a merchant site, at least one of the multiple items in the electronic catalog available for purchase in different sizes;
      one or more sliders, each of the one or more sliders corresponding to at least one of the multiple items; and
      an icon that, when selected, initiates purchase of the multiple items in the electronic catalog;
   in response to detecting manipulation of a slider of the one or more sliders, substituting an alternative item for a corresponding item by overlaying an image of the alternative item over a portion of the photographic image that includes the corresponding item, the alternative item having at least one different characteristic than the current item, the different characteristic including one of a size, a color, or a price;
   receiving an indication that a user of the merchant site has selected the icon to request the purchase of the multiple items in the electronic catalog, the multiple items including the alternative item;
   determining at least one item size associated with the user; and
   initiating the purchase of the multiple items in the electronic catalog, the purchase including the at least one item available for purchase in multiple sizes in the item size associated with the user.

2. One or more computer-readable media as recited in claim 1, wherein the multiple items in the electronic catalog comprise items that match the multiple items illustrated in the photographic image, items that have been deemed alternatives to the multiple items illustrated in the photographic image, or a combination thereof.

3. One or more computer-readable media as recited in claim 1, wherein the photographic image has been uploaded by the user or by another user of the merchant site.

4. One or more computer-readable media as recited in claim 1, wherein other users of the merchant site associate each of the multiple items in the photographic image with the associated item in the electronic catalog of the merchant site.

5. One or more computer-readable media as recited in claim 1, wherein the photographic image comprises a digital photograph of a person, the multiple items in the photographic image comprise articles of clothing worn by the person in the digital photograph, and the request to purchase the multiple items in the electronic catalog comprises a request to purchase each item of clothing or a similar item of clothing worn by the person in the digital photograph.

6. One or more computer-readable media as recited in claim 5, further storing computer-executable instructions that, when executed on the one or more processors, perform acts comprising:
receiving a request from the user to overlay the multiple items in the photographic image or the multiple items in the electronic catalog onto a representation of the user; and
responsive to the receiving of the request, causing display of the multiple items in the photographic image or the multiple items in the electronic catalog overlaying the representation of the user.

7. One or more computer-readable media storing computer-executable instructions that, when executed on one or more processors, perform acts comprising:
serving a user interface that includes:
a photographic image selected by a user that illustrates multiple items that have each been tagged within the photographic image as being associated with an item in electronic catalog(s),
a selection control corresponding to at least one of the multiple items; and
functionality to initiate acquisition of each of the multiple items in the electronic catalog(s);
in response to detecting manipulation of the selection control in a first direction, overlaying a first image of a first alternative item over a portion of the photographic image that includes a corresponding item, the first alternative item having a first characteristic that is different than the corresponding item;
in response to detecting manipulation of the selection control in a second direction, overlaying a second image of a second alternative item over the portion of the photographic image that includes the corresponding item, the second alternative item having a second characteristic that is different than the corresponding item;
receiving, from the user and via the functionality to initiate the acquisition, a request to acquire each of the multiple items in the electronic catalog(s);
determining an item preference associated with the user; and
initiating the acquisition of each of the multiple items in the electronic catalog(s) in accordance with the determined item preference.

8. One or more computer-readable media as recited in claim 7, wherein the functionality enables the user to initiate the acquisition of the multiple items in the electronic catalog(s) via a single user input.

9. One or more computer-readable media as recited in claim 7, wherein at least two of the items illustrated in the photographic image have been associated with respective items in different electronic catalogs or at least two of the items illustrated in the photographic image have been associated with respective items in a same electronic catalog.

10. One or more computer-readable media as recited in claim 7, wherein the multiple items in the electronic catalog(s) comprise items that match the items illustrated in the photographic image, items that have been deemed alternatives to the items illustrated in the photographic image, or a combination thereof.

11. One or more computer-readable media as recited in claim 7, wherein the photographic image comprises a digital photograph or a portion of a video uploaded by the user or by another user.

12. One or more computer-readable media as recited in claim 11, wherein multiple users of a community of users have previously tagged the multiple items in the digital photograph or the portion of the video as residing within the electronic catalog(s).

13. One or more computer-readable media as recited in claim 12, wherein the tagging of an item comprises associating an area that approximately frames a respective illustrated item in the photographic image with an item in a respective electronic catalog.

14. One or more computer-readable media as recited in claim 7, wherein the functionality to initiate the acquisition of the items comprises a selectable icon that appears over or adjacent to the photographic image.

15. One or more computer-readable media as recited in claim 14, wherein the selectable icon is displayed responsive to the user placing a cursor over the photographic image.

16. One or more computer-readable media as recited in claim 7, wherein the item preference associated with the user comprises a preferred size, a preferred color, a preferred price, a preferred brand, a preferred model, a preferred make, a preferred manufacturer or a preferred format.

17. One or more computer-readable media as recited in claim 7, wherein the initiating of the acquisition comprises initiating purchase, rental, lease or download of the multiple items in the electronic catalog(s).

18. One or more computer-readable media as recited in claim 7, wherein the initiating of the acquisition comprises placing the multiple items in the electronic catalog(s) in an electronic shopping cart of the user.

19. One or more computer-readable media as recited in claim 7, wherein the initiating of the acquisition comprises enabling the user to choose between acquiring items that match the items illustrated in the photographic image or items that have been tagged as alternatives to the items illustrated in the photographic image.

20. One or more computer-readable media as recited in claim 19, wherein the alternative items have been tagged as being: (i) similar to but less expensive than the items illustrated in the image, or (ii) similar to but superior to the items illustrated in the photographic image.

21. A system comprising:
one or more processors; and
one or more computer-readable media storing the computer-executable instructions as recited in claim 7.

22. One or more computer-readable media storing computer-executable instructions that, when executed on one or more processors, perform acts comprising:
- serving a user interface that includes:
  - media content provided by a user that visually represents multiple elements that have each been individually identified within the media content, the media content comprising one of a photographic image or a video;
  - displaying at least one slider, the at least one slider corresponding to at least one item of the multiple elements; and
  - functionality to initiate acquisition of the multiple elements or acquisition of information about the multiple elements;
- in response to detecting manipulation of the at least one slider, overlaying an image of at least one alternative item over the at least one item in the photographic image, thereby including the at least one alternative item in the multiple items in the photographic image, the at least one alternative item having a different characteristic than the at least one item;
- receiving, from the user and via the functionality, a request to acquire the multiple elements or the information about the multiple elements;
- determining previously-known information about the user; and
- initiating the acquisition of the multiple elements or the information about the multiple elements in accordance with the determined previously-known information about the user and based at least in part on the receiving of the request.

23. One or more computer-readable media as recited in claim 22, further storing computer-executable instructions that, when executed on the one or more processors perform acts comprising:
- before the serving of the user interface:
  - receiving, from the user, a plurality of media content including the media content that visually represents the multiple elements; and
  - facilitating identification of the multiple elements that the media content visually represents by the user and by at least one other user.

24. One or more computer-readable media as recited in claim 22, wherein the previously-known information about the user comprises a location of the user, demographic information of the user or preference information of the user.

25. One or more computer-readable media as recited in claim 22, wherein the request comprises a request to receive information about the multiple elements, and wherein the information about the multiple elements comprises a location of an illustrated element, contact information of an illustrated element, or instructions regarding how to acquire an illustrated element or a similar element.

26. A method comprising:
- under control of one or more computer systems configured with executable instructions,
- receiving a photograph provided by a user that illustrates a collection of items that are each found within an electronic catalog;
- creating an association between the photograph and each item of the collection of items in the electronic catalog(s);
- displaying a slider corresponding to an item of the collection of items in the photograph;
- in response to receiving user input to move the slider, overlaying an image of an alternative item over the item, thereby including the alternative item in the collection of items in the photograph, the alternative item having a different characteristic than the item;
- receiving a request from a user to acquire the collection of items illustrated by the photograph and found within the electronic catalog(s); and
- initiating acquisition of the collection of items at least in part based on the receiving of the request, the initiated acquisition being tailored to the user based on information associated with the user.

27. A method as recited in claim 26, further comprising causing display of the photograph that illustrates the collection of items and an icon that, when selected, initiates the request to acquire the collection.

28. A method as recited in claim 26, further comprising:
- determining, for at least one item of the collection of items, another item found within the electronic catalog(s) that is an alternative to the at least one item; and
- providing a recommendation to the user to acquire the alternative item.

29. A method as recited in claim 26, further comprising:
- determining a collection of items found within the electronic catalog(s) that comprise an alternative to the collection of items illustrated by the photograph; and
- providing a recommendation to the user to acquire the alternative collection.

30. A method as recited in claim 26, wherein the creating of the association occurs at least in part in response to receiving an indication that a user has tagged a respective item of the collection of items as residing within the electronic catalog(s).

31. One or more computer-readable media as recited in claim 26, wherein the initiating of the acquisition comprises placing the collection of items in an electronic shopping cart of the user.

* * * * *